(12) United States Patent
Julien

(10) Patent No.: US 6,514,521 B1
(45) Date of Patent: Feb. 4, 2003

(54) FEED ADDITIVE FOR MONOGASTRIC ANIMALS

(75) Inventor: William E. Julien, Douglas County, NE (US)

(73) Assignee: Catalyst Informational, Inc., Omaha, NE (US)

(*) Notice: Subject to any disclaimer, the term of this patent is extended or adjusted under 35 U.S.C. 154(b) by 0 days.

(21) Appl. No.: 09/642,924

(22) Filed: Aug. 21, 2000

Related U.S. Application Data

(60) Provisional application No. 60/151,388, filed on Aug. 30, 1999.

(51) Int. Cl.[7] ................................................ A23K 1/17
(52) U.S. Cl. ........................................................ 424/442
(58) Field of Search ................................. 424/442, 115; 426/53, 61, 805, 656

(56) References Cited

U.S. PATENT DOCUMENTS 5,709,894 A   1/1998   Julien ........................ 426/53
5,783,238 A   7/1998   Julien ........................ 426/63
5,863,574 A   1/1999   Julien ........................ 426/53

FOREIGN PATENT DOCUMENTS

WO           98/49903    * 11/1998

OTHER PUBLICATIONS

Yoshimura et . : CABA Abstract # 951413050 Nippon Nogeikagaku vol. 69, #3 pp 347–356, '95.*

* cited by examiner

*Primary Examiner*—Neil S Levy
(74) *Attorney, Agent, or Firm*—Paul M Denk

(57) ABSTRACT

A feed additive for monogastric animals, comprising dried glutamic acid fermentation solubles, dried corn fermentation solubles, or a mixture of dried glutamic acid fermentation solubles, wherein said dried solubles have been dried to a total moisture content of less than 30% by weight at a temperature that does not denature any organic nitrogen compounds present in the solubles and wherein the feed additive increases reproductive efficiency in monogastric animals.

7 Claims, No Drawings

FEED ADDITIVE FOR MONOGASTRIC ANIMALS

CROSS REFERENCE TO RELATED APPLICATIONS

This application is non-provisional patent application based upon provisional patent application having Ser. No. 60/151,388, filed on Aug. 30, 1999, which is owned by the same inventor.

STATEMENT REGARDING FEDERALLY SPONSORED RESEARCH OR DEVELOPMENT

N/A

BACKGROUND OF THE INVENTION

During certain phases of the life cycle of domestic monogastric animals, nutrient intake can be compromised by a number of physiologic factors. For example, in the period immediately preceding parturition, changes in hormonal balance associated with that event can negatively effect gastrointestinal motility, such that feed intake is reduced. The resulting reduction in nutrient availability to the animal has been associated with a number of metabolic disorders that are common to domestic monogastrics during this period. An example is the "MMA Syndrome" of the parturient sow. The etiology of this syndrome is associated with a state of systemic hypocalcemia which results from parturient inappetence. One avenue of research that has been proven to offer some relief from this problem is the dietary manipulation of ionic balance in the prepartum ration. Diets normally fed preparturient omivorous animals such as the sow are highly cationic in content. This is reflected in blood pHs that tend to be basic which is further reflected in the animal's highly basic urine pH, usually in the range of pH 8 or higher. By shifting the dietary balance of cations and anions in favor of anions for a period of time prepartum, a metabolic acidotic state can be achieved, and blood pH is reduced. Urine pH, the most easily measured response to a shift to an anionic diet is reduced and the degree of acidity is a function of the success of this shift. It is widely recognized by practitioners in the art that efficacy of dietary ionic shift is reflected in urinary pH reduction. Values below pH 8.0 are acceptable, but it is preferred that urine pH values fall below neutrality or pH 7.0. To accomplish this, it is recommended that dients have a cation/anion balance that is as negative as is possible, usually below (−) 60 meq/kg. This shift in homeostasis has been shown to increase feed intake, and improve nutrient homeostasis, thereby reducing the incidence of the resulting, associated metabolic and physiologic disorders such as MMA.

Currently dietary ionic shift has been attempted in ruminant animals through the supplementation of combinations of anionic salts. Examples include ammonium chloride, ammonium sulfate, calcium chloride and calcium sulfate. However, anionic salts as a group are highly unpalatable to most animals and are also potentially toxic, especially in monogastrics. Consequently, although the concept is widely accepted as physiologically efficacious, its practice is limited by a lack of an appropriate vehicle to achieve shift. This vehicle should be palatable, safe and metabolically effective, as indicated by blood or urine pH reduction.

BRIEF SUMMARY OF THE INVENTION

This invention relates to a feed additive for monogastric animals. When used as a component in a diet formulated for this class of animal, the additive will enhance feed intake and increase reproductive efficiency. In a preferred embodiment of the invention, two common byproduct materials, glutamic acid fermentation solubles and corn fermentation solubles are mixed and then dried at a temperature that does not denature the organic nitrogen components present therein. This temperature varies with the drying method used and generally ranges from not less than about 80° F. to not more than about 900° F.

In this invention, either of the glutamic acid fermentation or corn fermentation solubles, when dried as indicated above, can be used independently, but maximum response is elicited when both are present. To facilitate drying, the liquid solubles (either as a mixture of the two or independently), may be blended into a carrier such as wheat middlings. Thus, the invention relates to the dietary supplementation of monograstic animals with a combination of amino acids, peptides, and non-protein nitrogen supplied by either combining and drying glutamic acid fermentation solubles and corn fermentation solubles optionally with a carrier such as wheat middlings if needed, or either of these fermentation solubles alone optionally combined with said carrier. The drying of these materials is preferably accomplished at temperatures less than 900° F.

OBJECTS OF THE INVENTION

In view of the deficiencies in the art as described above and other related goals well known in the art, one object of the present invention is to provide a feed additive which allows for the successful dietary manipulation of intake cation/anion ratios, so as to allow for a shift in metabolic ionic homeostasis.

Another object of the present invention is to provide a feed additive that stimulates feed intake during periods of metabolic stress, such as just prior to parturition and in lactation.

Another object of the present invention is to maximize reproductive efficiency in monograstic animals, such as the dog or pig by reducing incidence of stillbirths and increasing numbers of offspring raised to weaning.

DETAILED DESCRIPTION OF THE INVENTION

The above objects have been obtained by the discovery of a composition comprised of dried free amino acids, peptides, organic and inorganic nitrogen, as well as structural fibre and nonstructural carbohydrates as needed. In the preferred embodiment of the invention, this composition is obtained from either glutamic acid fermentation solubles, corn fermentation solubles or a mixture thereof, although any source material that provides the components of these fermentation solubles may be used. Common sources are fermentation byproducts derived from a fermentation of fungal or bacterial origin. Examples include corn steep liquor, corn distiller's solubles, and rye distiller's solubles. The origin of the base materials is not important. That they provide the components of corn and/or glutamic acid fermentation solubles is. A carrier such as wheat middlings, etc., can be included if desired and in view of the drying method used. Any amount of carrier can be used. Typical ranges (wt/wt) of dried solubles to wheat middlings are from 10 to 1 to 1 to 10 including all values and subranges therebetween The carrier is preferably edible by the ruminant and is preferably a common feed ingredient. Either of these solubles alone or individually, blended onto a carrier if necessary, are suitable. When the corn and glutamic acid fermentation solubles are mixed, they are mixed in any proportion, either before or after drying and each optionally on a carrier if mixed dry.

The one or more solubles is then dried to a maximum moisture content of about 30% at low temperature. Moisture contents of 0%, 8%, 14%, etc., are acceptable. Drying methods which may be used include vacuum drying, direct and indirect heat application, spray drying, evaporation, etc. A forced air grain processor otherwise useful to roast soybeans is preferred. Regardless of the method used, drying must be done at temperatures which will allow for modification of the solubility of the nitrogen fractions without denaturing them.

The present inventor has provided a blended source of organic and inorganic nitrogen of variable solubilities in the form of nonprotein nitrogen, peptides, amino acids and intact protein derived in the preferred embodiment of the invention from glutamic acid fermentation solubles and/or corn fermentation solubles to which a carrier and additional amino acids can be added, and which is superior to prior art compositions.

Glutamic acid fermentation solubles and corn fermentation solubles are the liquid effluents having greater than 30 wt. % water (moisture), typically 50–60% from the bacterial fermentation process used to produce monosodium glutamate and lysine hydrochloride, respectively. These processes are well known and common manufacturing process, and the nomenclature by which these products are defined and has been determined by the association of American Feed Control Officials. Glutamic Acid Fermentation Solubles is comprised of a combination of water, nonprotein nitrogen, primarily in the form of ammonium chloride, peptides and free amino acids derived from the hydrolysis of the microorganisms used to produce the fermentation, glutamic acid and inorganic salts such as $MgSO_4$, $NaCl$ and $KH_2PO_4$. Corn Fermentation Solubles is comprised of a combination of water, nonprotein nitrogen, primarily in the form of ammonium sulfate, peptides and free amino acids derived from the hydrolysis of the microorganisms used to produce the fermentation and inorganic salts such as $MgSO_4$, $NaCl$, and $MnSO_4$.

The invention is useful as a feed additive in any monogastric animal's diet, but particularly in the diet of preparturient and parturient swine.

The invention feed supplement may be added to any feed fed to monogastric animals, preferably to feeds comprising at least one of grain byproducts, oilseeds and oilseed meals, corn grain, and small grains, etc., to provide a supplemented feed. The amount added will generally range from about 0.10 lbs. to about 2 lbs. per head per day, depending upon application and species to be fed.

Having generally described this invention, a further understanding can be obtained by reference to certain specific examples which are provided herein for purposes of illustration only and are not intended to be limiting.

EXAMPLES

Preparation of the Feed Supplement

In this example, the drying method used is forced air, although any process which allows for the removal of excess moisture while not damaging the biological value of the nitrogen components of the invention can be used, with the necessary modifications in materials preparation as dictated by the method used.

A mixture of Glutamic Acid Fermentation Solubles and Corn Fermentation Solubles at a ratio of 60/40 on a weight, weight bases is blended onto a wheat middlings carrier on a 1.67 to 1 weight, weight ratio of solubles to wheat middlings. These ratios can vary with the intended end product, or either of the components that make up the liquid blend can be used alone. The carrier may also be omitted if not desired or required by the drying process used. The material is then exposed to forced air at temperatures not less than about 80° F., but not more than about 900° F., with a preferred range being between about 190° F. and about 280° F., for a period of not less than about three minutes. This material is then cooled to about 90° F. and then about ⅓ of this material is recycled and reblended and again exposed to forced air at temperatures not less than about 80° F., but not more than about 900° F. The material has a final moisture content of about 15% by weight based on total weight. This material can then be fed directly to the animal as part of its formulated ration, with use rate dictated by species and intended dietary application.

AN INVESTIGATION INTO THE USE OF THE INVENTION

Feed Additive for Reducing Still Births and Increasing the Lactation Intake of Gilts and Sows.

An experiment was conducted to investigate the potential use of the invention feed additive in swine rations to reduce the proportion of still births, and to evaluate the use of the invention on lactation feed intake in gilts and sows and piglet growth.

Materials and Methods

One hundred and twenty commercial F1 mated gilts and third-litter sows were fed one of four diets for two weeks prior to farrowing:

A: Control gestation sow diet (13.0 MJ DE/kg; 6 g lysine/kg).

B: Supplemented gestation diet with 2% of the invention feed additive.

C: Control lactation sow diet (13.6 MJ DE/kg; 10 g lysine/kg).

D: Supplemented lactation sow diet with 2% of the invention feed additive.

Sixty primiparous sows and sixty parity 2 (third-litter) sows were randomly allocated by weight to one of the four treatments (15 per treatment) at approximately 100 days of gestation. Animals were fed individually in dry sow stalls. All sows were fed 3 kg/day in the morning. At approximately 110 days of gestation, animals were moved to farrowing crates and remained on their feeding treatment at a daily intake of 3 kg until farrowing.

After parturition, the number of piglets born alive, stillborn and total litter size was recorded. Litters (born alive and stillbirths) were weighed and recorded as a birth litter weight. After two days, litters were weighed as the start of the lactation assessment period. Litters were weighed at day 14 and at weaning at 26.8±0.34 days of age.

After farrowing, sows fed the gestation diets as Control or Supplemented were fed the Control lactation of Supplemented lactation diet, respectively. All sows were offered the diet ad libitum during lactation. Lactation intake was averaged over the first 14 days, day 14 to weaning and daily intake over the 27 day lactation.

The supplementation of either the gestation sow diet or the lactation sow diet tended to reduce the proportion of stillbirths. The mean value for the percentage stillbirths from sows fed the diets supplemented with 20 g/kg feed additive was 4.6% compared to 7.4% stillbirths in Control sows. The litter size born was similar between supplemented and control sows. See Table 1.

Commercially, a stillbirth percentage below 7% is targeted. The main effect of the invention supplementation tended to be significant (P=0.194) and the results certainly demonstrate that the feed additive does reduce stillbirths. Total litter size was also similar between dietary treatments. Given the main difference between the two diets is in the fibre content (4.5% to 3.5%), the cause of stillbirths would appear to be associated with digestive passage. Both diets were fed at 3 kg/day without major increases in stillbirths.

The relative effect of the feed additive of the present invention on the farrowing performance between the gilts and third-litter sows is summarized in Table 2. Although there was a significant difference in total litter size born between the gilts and sows, there was no significant different between supplementation within each parity. The improvement in stillbirths when diets were supplemented with the feed additive was more apparent in gilts (P=0.09) than third-litter sows. The results also confirmed that litter zie and piglet birth weight is significantly lower in gilt litters.

One hundred and four sows remained on trial during a 27 day lactation. The effect of supplementation before and during lactation on feed intake and piglet growth rate was measured. Litter size at day 2 after initial fostering was 9.9±0.09, and this is summarized in Table 3.

Sows fed the lactation diet supplemented with the feed additive had a higher daily feed intake in both the first 14 days and more so over the entire 27 day lactation. Sows fed the gestation diet, supplemented or as a control during gestation also resulted in a significant increase in post-farrowing intake. A combination of a supplemented gestation ration before parturition and a supplemented lactation ratio after parturition resulted in the highest intake. The diet x supplementation interaction was almost significant over the 27 days. Piglet growth rate was unaffected by either diet prior to farrowing or supplementation with the feed additive. These results support others that the sow's milk output is maximized and used here body reserves to buffer low lactation intakes.

The relative effect of feed additive supplementation on gilts and third-litter sows was also measured, and is shown in Table 4. Although piglet growth rate appeared to be lower in the supplemented gilts, the effect was not significant. This is probably explained by the higher (P=0.324) number of piglets weaned in the supplemented gilt litters (9.5 vs. 8.71). Litter gains were similar between the supplemented and control fed gilts (2.00 kg/day vs. 2.05 kg/day) in the first 14 days, and over the whole 26 day period (2.06 kg/day vs. 2.05 kg/day). Litter gains of third-litter sows were also similar between supplemented and control sows (2.59 kg/day vs. 2.58 kg/day) over 14 days and the 26 day period (2.55 kg/day vs. 2.45 kg/day). The number weaned was equal in these older litters (9.3).

The piglet growth rate and litter gains in both gilts and third-litter sows, independent of the feed additive of the present invention, was very high and may be used as a new benchmark target for sows. See Table 4. Additionally, piglet and litter weights at 14 days and 27 days are summarized in Table 5.

The results in Table 4 indicate that the positive effect of supplementation with the food additive of the present invention on lactation intake occurred predominantly in older sows. Nevertheless, the increased intake was not associated with a higher milk output. This represents that piglet growth and milk output is not limited by commercial sow feed intakes, but is more than likely a function of piglet vigor/birth weight.

It should be noted that there were lower stillbirths recorded from sows and gilts fed the gestation diet up to farrowing when compared with sows fed lactation diet during the last two weeks of pregnancy. There was no adverse effect of feeding the gestation sow diet, independent of the feed additive supplementation, on lactation intake. The gilts and third-litter sows had a higher (P<0.05) lactation intake during the first 14 days compared to sows introduced to the lactation diet in the last two weeks of gestation. Piglet birth weight was slightly higher in gilts fed higher energy in the lactation diet during the last weeks of gestation (1.4 kg vs. 1.3 kg), however in older sows there was no benefit to birth weight (1.6 kg) from feeding the extra energy in the lactation diet during gestation. Commercially, gilts and sows are fed the lactation diet for at least the last five days before farrowing. The benefits of feeding gestation diets through to farrowing as observed in this example need to be balanced with silo management.

TABLE 1

The effect of supplementing either the commercial sow gestation or the sow lactation diet with feed add. on the number of piglets born alive, still birth percentage, and piglet birth weight born to gilts and sows.

| Treatment | | No. of | Total | Born | Still-birth | Birth wt |
|---|---|---|---|---|---|---|
| Diet | Feed Add. | Sows | born | alive | (%) | (kg/pig) |
| Gestation | 0 | 28 | 10.8 | 10.1 | 6.0 | 1.48 |
| | 20 g/kg | 31 | 10.9 | 10.4 | 4.0 | 1.47 |
| Lactation | 0 | 29 | 10.9 | 10.3 | 8.8 | 1.45 |
| | 20 g/kg | 31 | 11.0 | 10.2 | 5.1 | 1.52 |
| SED | | | 0.58 | 00.25 | 1.09 | 0.02 |
| P Value | | | | | | |
| Diet | | | 0.880 | 0.993 | 0.382 | 0.795 |
| Feed Additive | | | 0.918 | 0.771 | 0.194 | 0.483 |
| Diet x Feed Additive | | | 0.998 | 0.971 | 0.460 | 0.781 |

TABLE 2

The effect of supplementing diets with feed add. On farrowing performance between gilts and sows.

| Treatment | | No. of | Total | Born | Stillbirth | Birth wt |
|---|---|---|---|---|---|---|
| Parity | Feed Add. | Sows | born | alive | (%) | (kg/pig) |
| Gilts | 0 | 28 | 9.8$^a$ | 9.2$^a$ | 8.1 | 1.35 |
| | 20 g/kg | 31 | 10.6$^{ab}$ | 10.2$^{ab}$ | 2.8 | 1.36 |
| 3$^{rd}$-Litter | 0 | 29 | 12.0$^b$ | 11.1$^b$ | 6.7 | 1.56 |
| Sows | 20 g/kg | 31 | 11.3$^b$ | 10.4$^{ab}$ | 6.3 | 1.64 |
| SED | | | 0.28 | 0.25 | 1.09 | 0.02 |
| P Value | | | | | | |
| Parity | | | 0.011 | 0.053 | 0.607 | <0.001 |
| Feed Additive | | | 0.918 | 0.771 | 0.194 | 0.483 |
| Diet x Feed Additive | | | 0.040 | 0.090 | 0.367 | <0.001 |

$^{ab}$Mean values with different superscripts differ significantly (P < 0.05) based on parity x feed add. Interaction.

TABLE 3

The effect of supplementing either the commercial sow gestation or the sow lactation diet with feed add. On daily feed intakes (AFI) and piglet growth (ADG) over 14 and 27 days of lactation.

| Treatment | | | AFI (kg/d) | Piglet ADG (kg/d) | AFI (kg/d) | Piglet ADG (kg/d) |
|---|---|---|---|---|---|---|
| Gest. Diet | Feed Add. | No. of Sows | Day 0–14 | Day 2–14 | Day 0–27 | Day 2–27 |
| Gestation | 0 | 24 | 5.79 | 0.253 | 5.84 | 0.254 |
| | 20 g/kg | 28 | 5.85 | 0.235 | 6.02 | 0.256 |
| Lactation | 0 | 23 | 5.66 | 0.246 | 5.40 | 0.260 |
| | 20 g/kg | 29 | 5.80 | 0.231 | 5.84 | 0.235 |
| SED | | | 0.09 | 0.006 | 0.09 | 0.005 |
| P Value | | | | | | |
| Diet | | | 0.632 | 0.674 | 0.087 | 0.346 |
| Feed Additive | | | 0.597 | 0.194 | 0.073 | 0.211 |
| Diet × Feed Additive | | | 0.906 | 0.603 | 0.082 | 0.204 |

TABLE 4

The effect of feed add supplementation on daily feed intakes (AFI) and piglet growth (ADG) over 14 and 27 days of lactation.

| Treatment | | | AFI (kg/d) | Piglet ADG (kg/d) | AFI (kg/d) | Piglet ADG (kg/d) |
|---|---|---|---|---|---|---|
| Parity | Feed Add. | No. of Sows | Day 0–14 | Day 2–14 | Day 0–27 | Day 2–27 |
| Gilts | 0 | 23 | 5.50[a] | 0.222[a] | 5.48[a] | 0.241[a] |
| | 20 g/kg | 29 | 5.49[a] | 0.207[a] | 5.67[a] | 0.221[a] |
| 3rd litter | 0 | 24 | 5.96[ab] | 0.276[b] | 5.72[b] | 0.271[b] |
| | 20 g/kg | 28 | 6.18[b] | 0.258[b] | 6.19[b] | 0.270[b] |
| SED | | | 0.09 | 0.006 | 0.09 | 0.005 |
| P Value | | | | | | |
| Parity | | | 0.001 | 0.001 | 0.030 | 0.001 |
| Feed Additive | | | 0.597 | 0.194 | 0.073 | 0.211 |
| Diet × Feed Additive | | | 0.009 | 0.001 | 0.028 | 0.001 |

[ab]Mean values with different superscripts differ significantly (P < 0.05) based on parity × feed add. interaction.

TABLE 5

The effect of feed add supplementation on average piglet and litter weight (kg) at 14 and 27 days of age nursing gilts and third-litter sows.

| Treatment | | | Piglet Weight (kg) | | Litter Weight (kg) | |
|---|---|---|---|---|---|---|
| Parity | Feed Add. | No. of Sows | 14 Days | 27 Day | 14 Days | 27 Day |
| Gilts | 0 | 23 | 4.3 | 7.5 | 40.3 | 58.9 |
| | 20 g/kg | 29 | 4.1 | 7.0 | 39.7 | 60.7 |
| 3rd litter | 0 | 24 | 5.2 | 8.7 | 49.7 | 75.7 |
| | 20 g/kg | 28 | 5.0 | 8.8 | 50.6 | 78.7 |
| SED | | | 0.09 | 0.16 | 0.87 | 1.60 |
| P Value | | | | | | |
| Parity | | | <0.001 | <0.001 | <0.001 | <0.001 |
| Feed Additive | | | 0.3487 | 0.497 | 0911 | 0.532 |
| Diet × Feed Additive | | | <0.001 | <0.001 | <0.001 | <0.001 |

What is claimed is:

1. A method of feeding a monogastric animal comprising the step of feeding the monogastric animal a feed additive comprising dried glutamic acid fermentation solubles wherein the dried solubles have been dried to a total moisture content of less than 30% by weight at a temperature that does not denature any organic nitrogen compounds present in the solubles in an amount from 0.10 to 2.0 pounds per day.

2. The feed additive of claim 1 where the temperature is not less than 80° F. and not more than 900° F.

3. The feed additive of claim 1 further comprising a carrier.

4. The feed additive of claim 3 wherein the carrier is wheat middlings.

5. The feed additive of claim 4 wherein a range by weight of dried solubles to wheat middlings is from 10 to 1 to 1 to 10.

6. The feed additive of claim 1 further comprising glutamic acid.

7. The feed additive of claim 1 further comprising amino acid.

* * * * *

UNITED STATES PATENT AND TRADEMARK OFFICE
CERTIFICATE OF CORRECTION

PATENT NO. : 6,514,521 B1
DATED : February 4, 2003
INVENTOR(S) : William E. Julien It is certified that error appears in the above-identified patent and that said Letters Patent is hereby corrected as shown below:

<u>Title page,</u>
Item [73], Assignee is listed as "Catalyst Information, Inc." the correct name of the Assignee is -- Catalyst International, Inc. --

Signed and Sealed this

Twenty-second Day of July, 2003

JAMES E. ROGAN
*Director of the United States Patent and Trademark Office*